Nov. 5, 1968   J. E. McCURRY   3,408,764
FISHING LURE
Filed Oct. 24, 1965
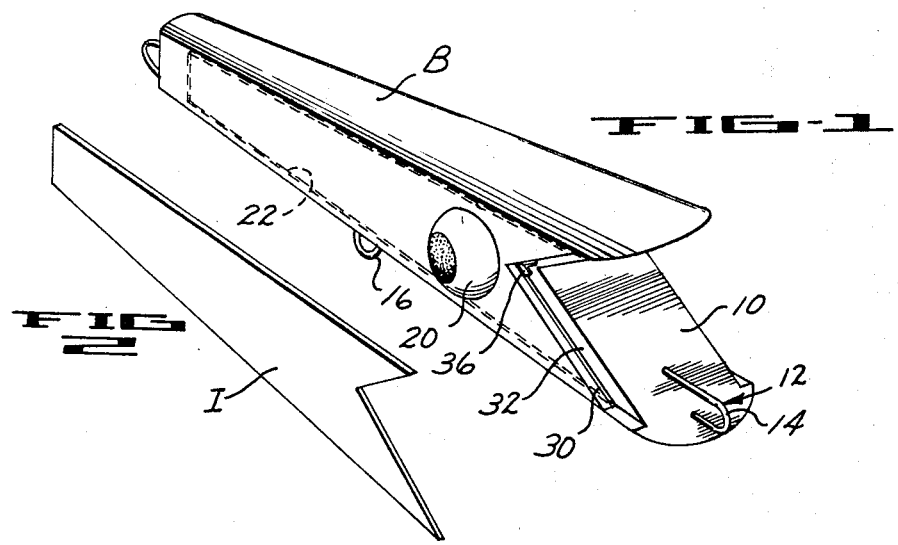
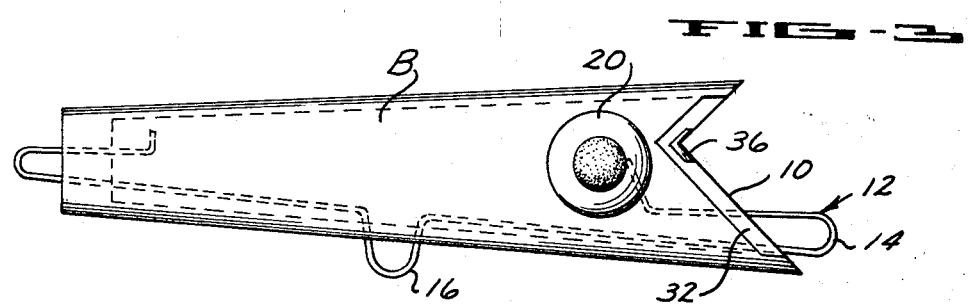
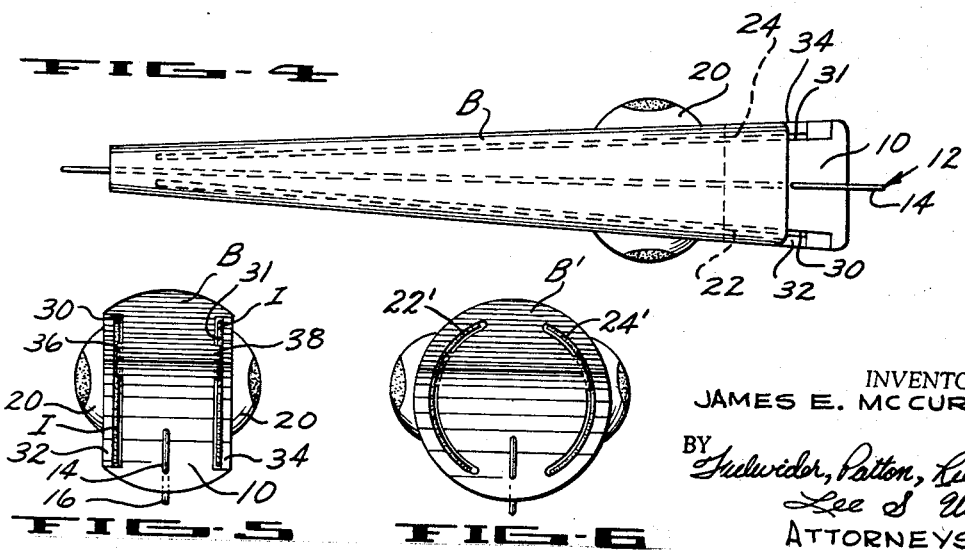
INVENTOR.
JAMES E. McCURRY
BY Fulwider, Patton, Rieber,
Lee & Utecht
ATTORNEYS

United States Patent Office 3,408,764
Patented Nov. 5, 1968

3,408,764
FISHING LURE
James E. McCurry, 2171 Nautical St.,
Anaheim, Calif. 92802
Filed Oct. 24, 1965, Ser. No. 504,620
2 Claims. (Cl. 43—42.09)

ABSTRACT OF THE DISCLOSURE

A fishing lure having a transparent fish-simulating body formed with generally longitudinal vertical slots in its side portions and with openings to the slots located adjacent its front side edges. The slots removably receive flexible colored inserts, the inserts being held in place by stop means adjacent the openings. The colored inserts may be changed as desired to meet the existing fishing requirements.

---

The present invention relates generally to the art of fishing and more particularly to a new and novel fishing lure.

It is common practice for the average fisherman to carry with him fishing lures of different colors, one or more of which may be successful on a particular day or at a particular location to catch fish. The carrying of several lures of different colors is annoying to the fisherman, particularly since such lures occupy a large portion of his tackle box. Additionally, fishing lures are comparatively expensive and the need to purchase several lures of different colors increases the cost of fishing.

It is a major object of the present invention to provide a fishing lure the color of which may be changed as desired to meet the existing fishing requirements.

Another object of the present invention is to provide a fishing lure having a transparent or translucent body provided with removable inserts of varying colors.

A further object of the present invention is to provide a fishing lure of the aforedescribed nature which is simple of design and rugged of construction.

Yet a further object of the present invention is to provide a fishing lure of the aforedescribed nature wherein the colored inserts are readily interchangeable and yet once disposed within the body are firmly locked in place.

These and other objects and advantages of the present invention will become apparent from the following detailed description, when taken in conjunction with the appended drawings wherein:

FIGURE 1 is a perspective view showing a preferred form of fishing lure embodying the present invention;

FIGURE 2 is a perspective view of a colored insert utilized with said fishing lure;

FIGURE 3 is a side elevational view of said fishing lure;

FIGURE 4 is a top plan view of said fishing lure;

FIGURE 5 is a front view of said fishing lure; and

FIGURE 6 is a front view of a modified form of said fishing lure.

Referring to the drawings, a preferred form of fishing lure embodying the present invention includes a transparent body B. The body B has the general appearance of a small bait fish and is preferably formed of a synthetic plastic. The front portion of the body B is formed with a rearwardly-extending recess 10 having the general appearance of an open mouth. A longitudinally-extending wire 12 is embedded within the body 10. The front portion of the wire 12 is curved so as to define a loop 14 that receives a fish line or leader (not shown). The intermediate portion of the wire 12 is formed with a depending loop 16 that may receive a conventional fish hook. The rear portion of the wire 12 is also formed with a loop that may receive another conventional fish hook (not shown). Preferably, the front portion of the body B is formed with a pair of simulated eyes 20.

The side portions of the body B are formed with a pair of generally longitudinally-extending vertical slots 22 and 24. The slots 22 and 24 are of like shape and generally taper rearwardly and inwardly at the same angle as the body B. The slots terminate adjacent the rear end of the body B, with the front end of such slots being open as indicated at 30 and 31.

It should be particularly noted that the front portion of the body B is formed with inwardly-extending recesses 32 and 34 to provide access for the front openings 30 and 31 of the slots 22 and 24 respectively. It should also be noted that the intermediate portion of the pockets 32 and 34 are each formed with an outwardly-extending stop designated 36 and 38 respectively.

Each of the slots 22 and 24 receive a like insert I shown particularly in FIGURE 2. Referring to FIGURE 2, it will be observed that the inserts I have the approximate configuration of the slots 22 and 24 but are of somewhat smaller overall dimensions. This permits the inserts I to be removably inserted within the slots 22 and 24. The inserts I will be formed in various colors and preferably of a synthetic plastic material.

In the use of the above-described fishing lure, the fisherman selects a pair of the inserts I of the same desired color. These inserts are then forced into the slots 22 and 24 by inserting the rear of such inserts within the openings 30 and 31, respectively, and thereafter urging the inserts rearwardly. The inserts I should be somewhat flexible whereby they may be bent outwardly to move past the stops 36 and 38. Once the front edge of the inserts have been moved rearwardly past the stops 36 and 38, the stops will function to prevent inadvertent forward movement of the inserts out of the slots 22 and 24. It will be apparent that the inserts I may be readily removed whereby a pair of inserts of a different color may be easily substituted therefor.

Referring now to FIGURE 6, there is shown a modified form of the fishing lure embodying the present invention shown in FIGURES 1 through 5, and like parts in FIGURE 6 bear primed reference numerals. In this form of the invention the body B' is more of a cylindrical shape and the slots 22' and 24' are of annular configuration. The slots 22' and 24' receive flexible flat inserts similar to the inserts I described hereinabove. Since it is necessary to flex the inserts into an annular shape whereby they may be inserted within the slots 22' and 24', additional frictional resistance will be thereby created serving to prevent inadvertent withdrawal of the inserts from the slots 22' and 24'. With this arrangement, it is not essential to provide the stops 36 and 38 described hereinbefore.

I claim:
1. A fishing lure, comprising:
    a transparent fish-simulating body having flattened front end surfaces and formed at its front edge side portions with a pair of inwardly-extending recesses, said body also being formed at its side portions with a pair of generally longitudinal vertical slots that extend rearwardly from a pair of openings, with said recesses being in longitudinal alignment respectively with said openings and providing access to said openings, and said slots terminating adjacent the rear end of said body;
    a pair of flexible colored inserts removably insertable through said openings into said slots; and
    means formed on said body restraining inadvertent withdrawal of said inserts from said slots.
2. A fishing lure, comprising:
    a transparent fish-simulating body having flattened front end surfaces and formed at its front edge side por- tions with a pair of inwardly-extending recesses, said body also being formed at its side portions with a pair of generally longitudinally vertical slots that extend rearwardly from a pair of openings, with said recesses being in longitudinal alignment respectively with said openings and providing access to said openings, and said slots terminating adjacent the rear end of said body;

a pair of flexible colored inserts removably insertable through said openings into said slots; and outwardly-extending stop means formed on said body adjacent each of said openings that restrain said inserts against inadvertent withdrawal from said slots.

References Cited

UNITED STATES PATENTS

| 1,740,335 | 12/1929 | Cowan | 43—42.09 |
| 2,006,604 | 7/1935 | Post | 43—42.33 |
| 2,335,322 | 11/1943 | Taylor | 43—42.09 X |
| 2,573,592 | 10/1951 | Nickel | 43—42.09 |

FOREIGN PATENTS

| 934,245 | 8/1963 | Great Britain. |

SAMUEL KOREN, *Primary Examiner.*

J. H. CZERWONKY, *Assistant Examiner.*